US006662937B2

United States Patent
Warnecke

(10) Patent No.: US 6,662,937 B2
(45) Date of Patent: Dec. 16, 2003

(54) DEVICE FOR INWARD AND/OR OUTWARD TRANSFER OF MATERIAL TO BE CONVEYED

(75) Inventor: Karl Warnecke, Sibbesse (DE)

(73) Assignee: Transnorm System GmbH, Harsum (DE)

(*) Notice: Subject to any disclaimer, the term of this patent is extended or adjusted under 35 U.S.C. 154(b) by 0 days.

(21) Appl. No.: 10/090,059

(22) Filed: Feb. 28, 2002

(65) Prior Publication Data

US 2002/0121423 A1 Sep. 5, 2002

(30) Foreign Application Priority Data

Mar. 3, 2001 (DE) ..................................... 201 03 758 U

(51) Int. Cl.[7] ............................................. B65G 15/02
(52) U.S. Cl. ........................................ 198/831; 198/839
(58) Field of Search ................................. 198/831, 839

(56) References Cited

U.S. PATENT DOCUMENTS

| | | | | | |
|---|---|---|---|---|---|
| 1,207,065 A | * | 12/1916 | Miller | .......................... | 198/182 |
| 1,698,786 A | * | 1/1929 | Finn | ............................ | 198/182 |
| 2,234,537 A | * | 3/1941 | Blackburn | .................. | 198/182 |
| 2,253,913 A | * | 8/1941 | Paterson | ..................... | 198/182 |
| 2,446,890 A | * | 8/1948 | Stadelman | .................. | 198/182 |
| 2,633,975 A | * | 4/1953 | Koerber | ...................... | 198/182 |
| 2,855,091 A | * | 10/1958 | Frandsen | .................... | 198/182 |
| 3,044,603 A | * | 7/1962 | Fry | ............................. | 198/182 |
| 3,217,861 A | * | 11/1965 | Daniluk et al. | .............. | 198/182 |
| 3,265,193 A | * | 8/1966 | Bessant | ....................... | 198/182 |
| 5,083,657 A | | 1/1992 | Kelsey | | |
| 5,988,362 A | * | 11/1999 | Nakamura et al. | ........... | 198/831 |
| 5,992,615 A | * | 11/1999 | Muchalov | .................... | 198/831 |
| 6,050,395 A | * | 4/2000 | Shannon et al. | ............. | 198/831 |
| 6,053,306 A | * | 4/2000 | Osaka et al. | ................. | 198/831 |
| 6,085,895 A | * | 7/2000 | Osaka et al. | ................. | 198/831 |
| 6,098,790 A | * | 8/2000 | Warnecke | .................... | 198/831 |

FOREIGN PATENT DOCUMENTS

| | | | |
|---|---|---|---|
| DE | 37 26 747 | 2/1989 | |
| DE | 20103758 | 5/2001 | |
| EP | 0423415 | 4/1991 | |
| EP | 0 678 464 | 3/1995 | |
| EP | 0678464 A1 * | 3/1995 | ........... B65G/47/52 |
| EP | 0678464 | 10/1995 | |
| JP | 02193803 | 7/1990 | |

* cited by examiner

Primary Examiner—Joseph A. Dillon
Assistant Examiner—Rashmi Sharma
(74) Attorney, Agent, or Firm—Collard & Roe, P.C.

(57) ABSTRACT

A device for inward and outward transfer of material to be conveyed at an angle into a conveyor section. The device comprises an airlock section over which the material is conveyed, having a rectangular end area and an acute-angle end area; and a guide section disposed proximate to the acute-angle end area of the airlock section. A continuous belt is guided around the airlock and the guide section and a drive moves the continuous belt. A guide element is disposed at the acute-angle end area of the airlock section, and is detachable on at least one end.

9 Claims, 6 Drawing Sheets

DEVICE FOR INWARD AND/OR OUTWARD TRANSFER OF MATERIAL TO BE CONVEYED

BACKGROUND

This invention relates to a device for the inward and/or outward transfer of material, which is conveyed at an angle into a conveyor section with a continuous belt. The continuous belt is guided, by a drive, around an airlock section with a guide section. The airlock section has a rectangular end area and an acute-angle end area.

A belt conveyor with an inward and outward transfer device is shown in European Patent 0 678 464 B1. The conveyed material is sent to a conveyor section. An end area of the belt conveyor is designed with an acute angle. For example, a 45° or 30° angle to the direction of travel is formed, so that the belt conveyor or the device for supplying the conveyed material can be applied to the main conveyor section at an angle different from 90°. The part of the device over which the material is transported is referred to as the airlock section. The second part of the device over which the continuous belt is guided is referred to as the guide section.

In European Patent 0 678 464 B1, referring to a guide roller, also referred to as a back-up roller, is provided as well as a driving drum. The guide roller guides the lower strand of the conveyor belt without belt tension so that the belt is wrapped more than 180° around the driving drum. At the start of rotation of the driving drum, a very high traction can develop without having to apply a belt tension which would lead to an unwanted increase in friction.

SUMMARY

The object of the present invention is to create a device for inward and/or outward transfer of material conveyed at an angle. Another object of the invention is to create a device that is especially simple to maintain.

According to this invention, a guide element of the acute-angle end area of the airlock section is detachable on at least one side. The guide element is preferably detachable so that the continuous belt can be relaxed or removed. This greatly facilitates maintenance of the device and replacement of a damaged continuous belt.

The guide element is pivotable about its end mount so that it can be pivoted over the entire length. The guide element is preferably pivoted in the direction of the airlock section, in particular the rectangular end area. It is also preferably pivotally attached at the side of the acute-angle end area which is in proximity to the guide section. This permits the guide element to detach on the side of the acute-angle end area, opposite the guide section and pivot toward the airlock section. The continuous belt can be released easily when the guide element is pivoted far enough so that the continuous belt can be removed or pushed off. Two guide elements arranged in parallel are preferably pivotable. In this arrangement the upper strand of the conveyor belt is guided about the upper guide element and the lower strand is guided about the lower guide element.

The guide element is preferably designed with a circular cross section, although other designs such as an octagonal or a hexagonal cross section would also be favorable in many cases.

The drive is preferably arranged in proximity to the rectangular end area of the airlock section. Therefore, the drive elements are arranged at a distance from the guide element, so that the guide element may be pivotable in the manner described above without having any negative effect on the drive or the stability of the drive. The drive is preferably designed so that a back-up roller, in proximity to a driving drum, is pivotable about the driving drum, and the back-up roller is acted upon by a certain force to create a defined belt tension. This is preferably accomplished with the aid of a spring. It is also possible to use a pneumatically operated device or a device that pushes the back-up roller downward and against the belt to produce a defined belt tension.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
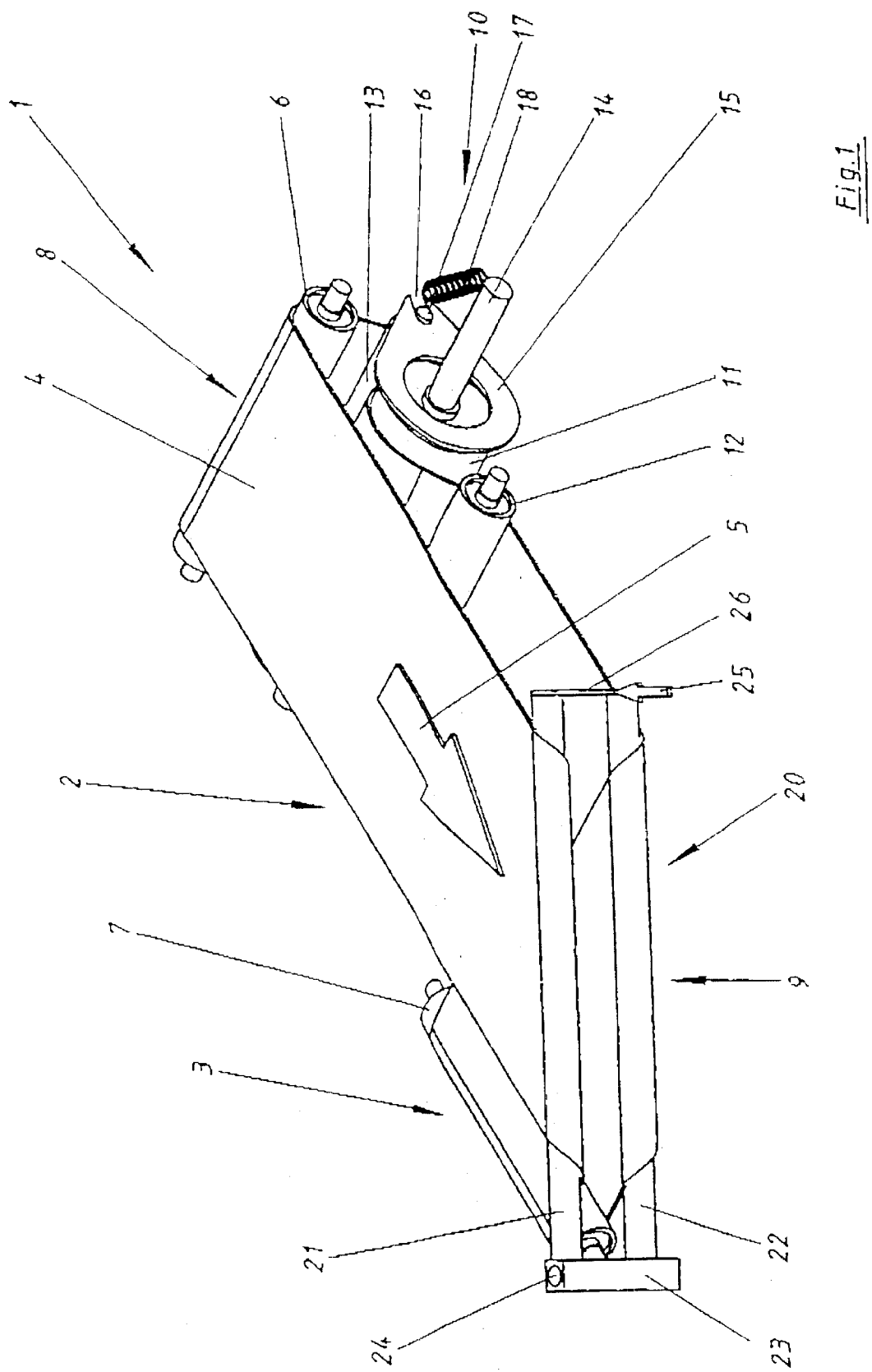
FIG. 1 is a perspective view of the device designed as an inward transfer device.

Referring to the drawings, FIG. 1 shows a perspective view of a device 1 according to this invention designed as an inward transfer device. Device 1 has an airlock section 2 and a guide section 3, where material to be conveyed can be transferred inward, through airlock section 2 from a rectangular end area 8 to an acute-angle end area 9. The material is conveyed in the direction of arrow 5 into a conveyor section passing by acute-angle end area 9. Device 1 has a continuous belt 4 which is referred to as the upper strand on the upper side and as the lower strand on the lower side. Continuous belt 4 is driven by a drive 10. As an inward transfer device, drive 10 operates as a push-action drive, with continuous belt 4 being guided by the drive over a guide roller 6 in rectangular end area 8 of airlock section 2 and then over a guide device 20 which forms acute-angle end area 9 of guide section 3. The belt runs from there back to a lower part of guide device 20 and then back to drive 10.

Drive 10 is formed essentially by a driving drum 11, a guide roller 12 and a back-up roller 13. Guide roller 12 and back-up roller 13 ensure that continuous belt 4 is in contact with driving drum 11 over a large angle of wrap, developing a very large traction. Driving drum 11 is arranged on a driven axle 14 in a stationary arrangement. Likewise, guide roller 6 is in a stationary arrangement. On the other hand, back-up roller 13 is mounted displaceably in the circumferential direction about driving drum 11, specifically in a suspension 15 which is mounted to rotate about axle 14 of driving drum 11. Suspension 15 is designed in the form of a disk with a recess 16 into which an axle 17 of driving drum 11 is inserted. Back-up roller 13 is arranged between driving drum 11 and rectangular end area 8 and is also pulled downward by a spring 18. This causes a certain tension on the continuous belt which runs in the opposite direction beneath back-up roller 13. Through the spring force of spring 18, the tension of continuous belt 4 can be predetermined without requiring any complicated settings and adjustments by technical personnel. Spring 18 is shown here as a tension spring. As an alternative, it may be designed so that a rod acting on suspension 15 is in turn acted upon by a compression spring which is supported on a fixed point on the device and therefore exerts a tensile force on the rod. The compression spring is thus wrapped around the rod and is supported on an eye ring through which the rod passes and is mounted in a stationary arrangement on the device. With the other end, the compression spring is supported on an enlarged end area of the rod, so that the compression spring presses the rod outward on the whole and thus exerts a tensile force on the continuous belt.

Guide device 20 provided in acute-angle end area 9 of airlock section 2 has an upper guide element 21 about which the upper strand is guided, and a lower guide element 22 about which the lower strand is guided. Guide elements 21 and 22 are attached to a holder 23 which is pivotable about a pivot axle 24 so that the guide elements 21 and 22 can be pivoted in the direction of the arrow 25. To do so, the guide elements 21 and 22 are detachable in the right edge area, in particular on a frame 26.

FIG, 2 shows a second perspective view of the device according to FIG. 1. Back-up roller 13 is more clearly displayed in FIG. 2. Back-up roller 13 is arranged on a continuous axle with springs 18 on both sides of the axle 17, guaranteeing a uniform tensile effect.

Figure 2:
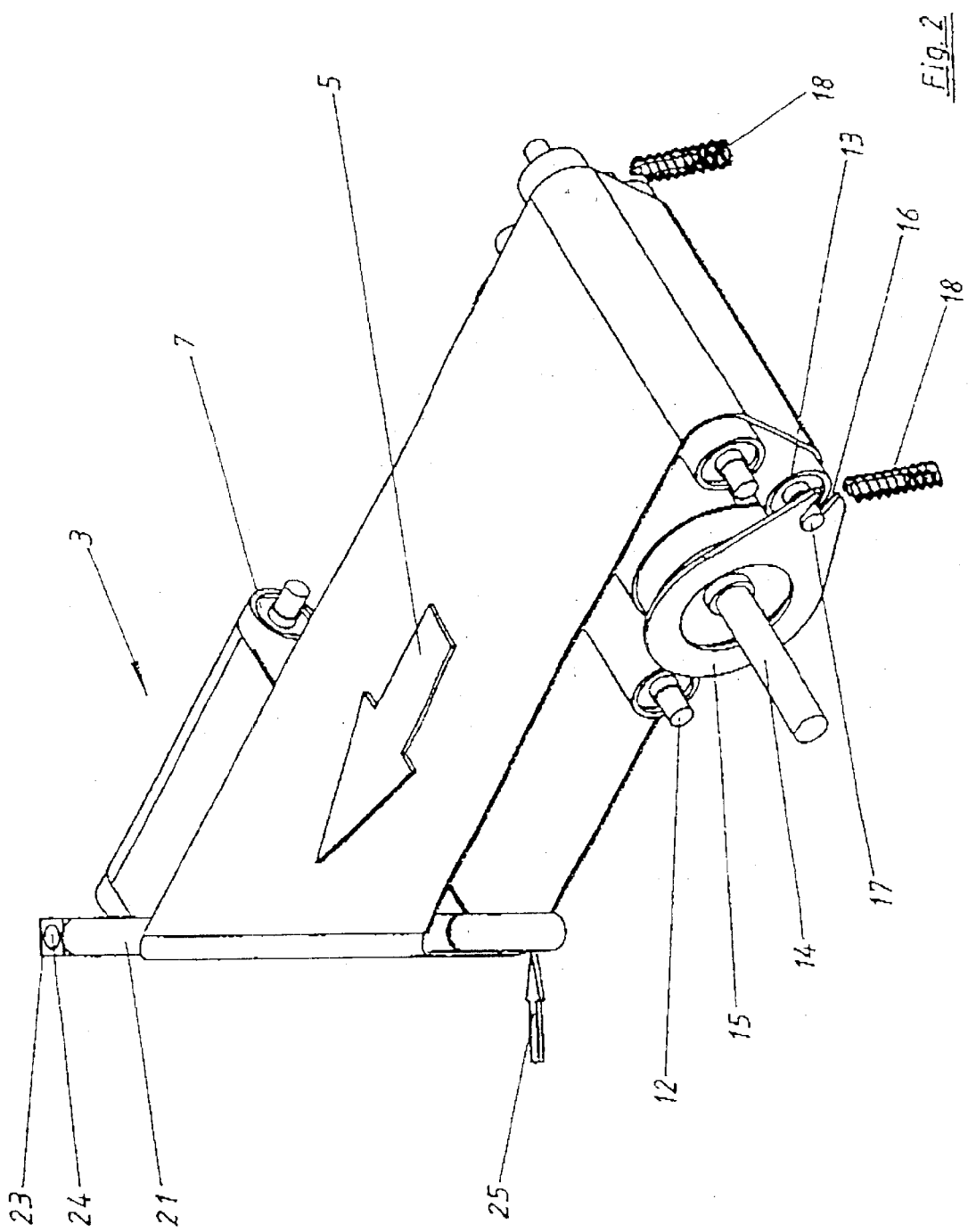
FIG. 2 is a second perspective view of the device according to FIG. 1.
Figure 3:
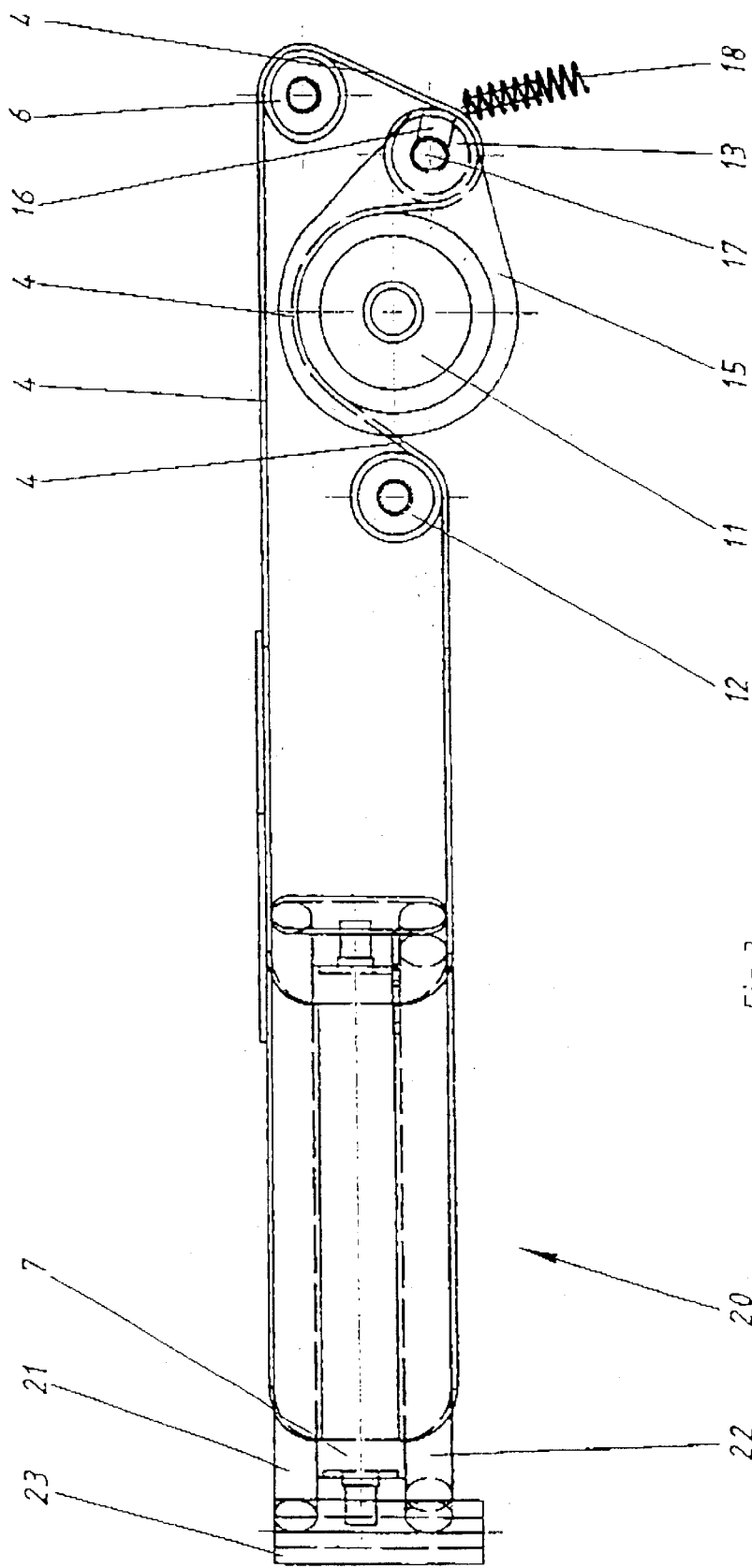
FIG. 3 is a cross-sectional view of the device according to FIG. 1

FIG. 3 shows a cross-sectional view through the device according to FIGS. 1 and 2. This also shows clearly that continuous belt 4 is guided around back-up roller 13, driving drum 11, and guide roller 12, so that driving drum 11 is wrapped over the largest possible area of the circumference. Upper guide element 21 about which the upper strand of the conveyor belt passes, is shown in the area of guide device 20. From upper guide element 21 belt 4 goes to a guide roller 7 of guide section 3 and then back over lower guide element 22, continuing there as the lower strand of the conveyor belt. Guide elements 21 and 22 are arranged on holder 23. The front frame 26 shown in FIG. 1 cannot be seen in this cross-sectional view.

Figure 4:
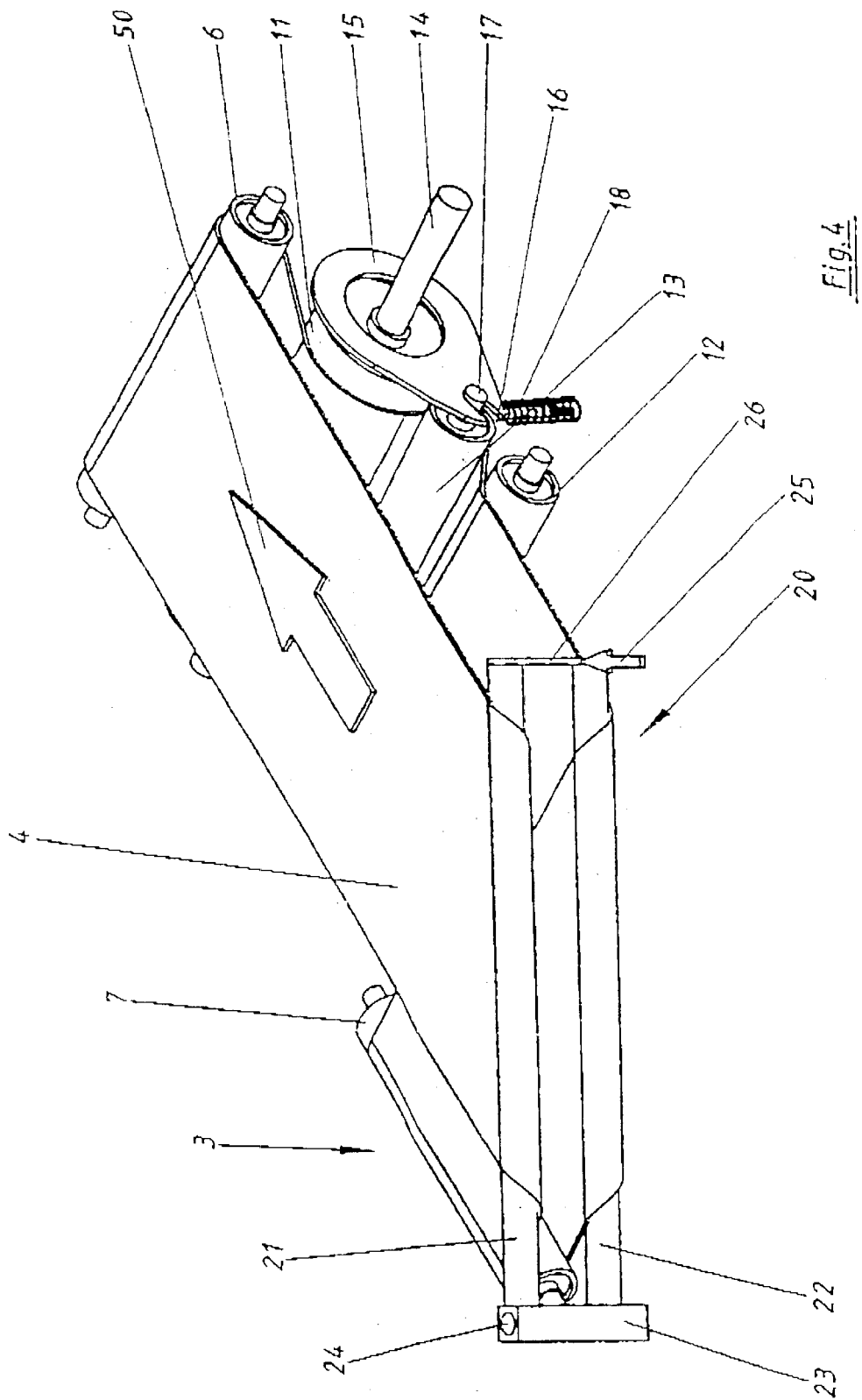
FIG. 4 is a perspective view of the device, designed as an outward transfer device.

FIG. 4 shows a second embodiment of the device according to this invention; it functions as an outward transfer device, as indicated by arrow 50, which shows that continuous belt 4 runs from acute-angle end area 9 of airlock section 2 to rectangular end area 8 of airlock section 2. With such an arrangement, it is customary to speak of a tractive drive. Drive 10 may also be designed with guide roller 12, driving drum 11 and back-up roller 13, but the sequence of the arrangement of rollers is different from that of the push-action embodiment of FIGS. 1 and 3. Back-up roller 13 is arranged here on the side of driving drum 11 facing away from rectangular end area 8 of airlock section 2 and is therefore between driving drum 11 and guide roller 12 assigned to this driving drum 11.

Figure 5:
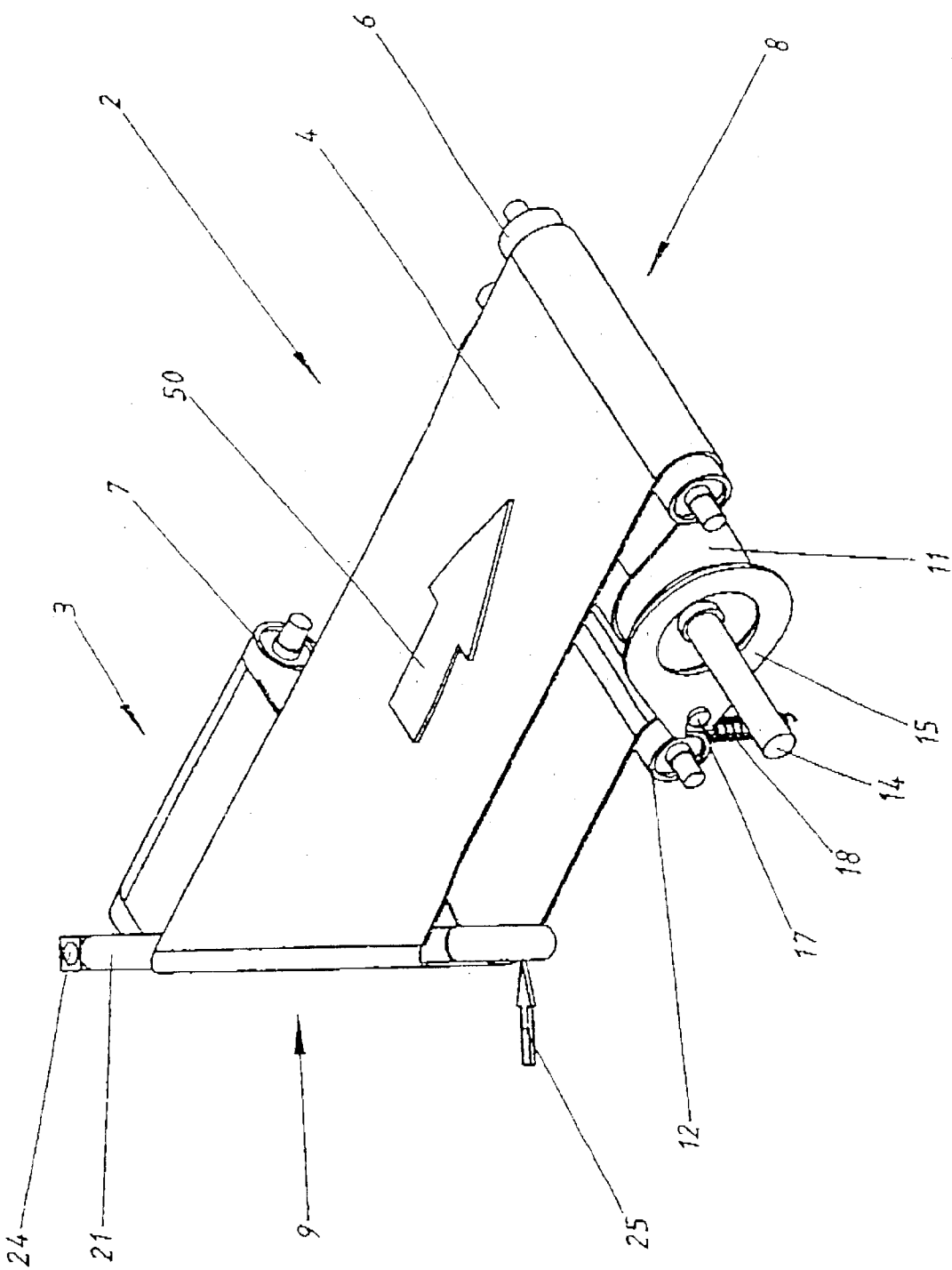
FIG. 5 is a second perspective view of a device according to FIG. 4.
Figure 6:
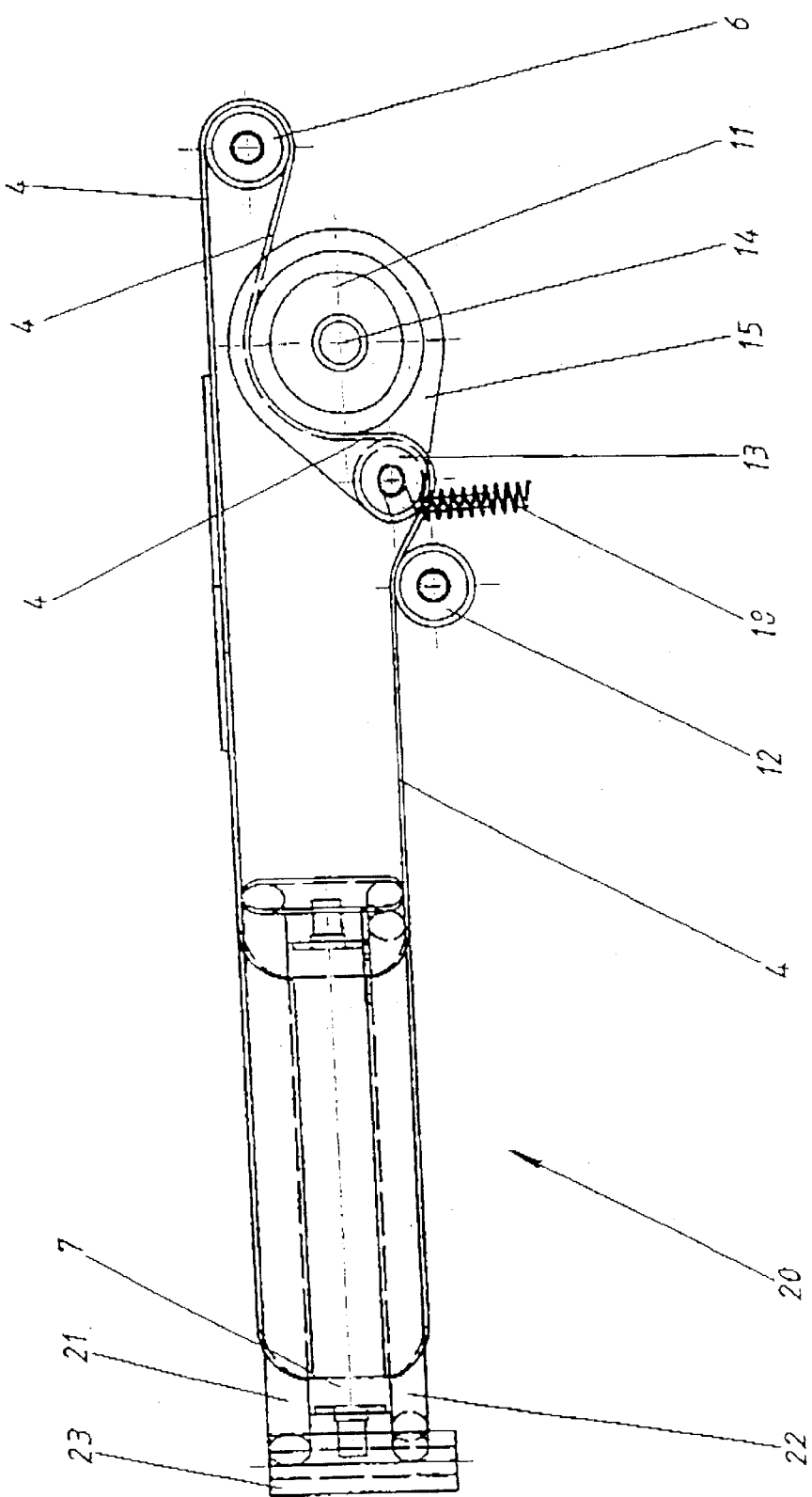
FIG. 6 is a cross-sectional view of a device according to FIG. 4.

FIG. 5 shows a second perspective view of FIG. 4, while FIG. 6 shows a cross sectional view of FIGS. 4 and 5.

FIG. 6 shows a cross-sectional view of FIGS. 4 and 5. Here again, the same parts are labeled with the same reference numbers.

Accordingly, while two embodiments of the present invention have been shown and described, it is to be understood that many changes and modifications may be made thereunto without departing from the spirit and scope of the invention as defined in the appended claims.

What is claimed is:

1. A device for inward and outward transfer of material to be conveyed at an angle into a conveyor section comprising:
   a) a continuous belt guided over the length of the device, wherein said continuous belt forms two sections comprising:
      i) an airlock section around which said continuous belt is guided and over which the material is conveyed, wherein said airlock section has a rectangular end area and an acute-angle end area; and
      ii) a guide section disposed adjacent to said acute-angle end area of said airlock section and around which said continuous belt is guided, wherein said guide section is coupled to said airlock section via said continuous belt;
   b) a drive disposed in said airlock section for moving said continuous belt; and
   c) at least one guide element pivotable about an end mount and disposed at said acute-angle end area of said airlock section and coupled to said continuous belt, wherein said at least one guide element is detachable on at least one end;
   wherein said at least one guide element can be pivoted so far that said continuous belt can be removed; and
   wherein said drive moves said continuous belt over said airlock section and said guide section to convey the material in to, and out from the conveyor section.

2. A device according to claim 1 wherein said at least one guide element is pivotable toward said airlock section.

3. A device according to claim 1 wherein said at least one guide element is detachable on a side of said airlock section opposite said guide section.

4. A device according to claim 1 wherein two guide elements are pivotable.

5. A device according to claim 1 wherein said at least one guide element has a circular cross section.

6. A device according to claim 1 wherein said drive is mounted in proximity to said rectangular end area of said airlock section.

7. A device according to claim 1, wherein said drive has a driving drum and a back-up roller arranged in proximity thereto, wherein said back-up roller pivots about said driving drum in a circumferential direction.

8. A device according to claim 7, further comprising a spring which acts upon said back-up roller to produce a defined belt tension.

9. A device for inward and outward transfer of material to be conveyed at an angle into a conveyor section comprising:
   an airlock section over which the material is conveyed, having a rectangular end area and an acute-angle end area;
   a guide section disposed adjacent to said acute-angle end area of said airlock section;
   a continuous belt that is guided around said airlock section and said guide section, coupling said airlock section and said guide section together;
   a drive for moving said continuous belt; and
   at least one guide element pivotable about an end mount and disposed at said acute-angle end area of said airlock section and coupled to said continuous belt, wherein said at least one guide element is detachable on at least one end and can be pivoted so that said continuous belt can be removed.

* * * * *